Feb. 26, 1957 E. C. NOVOTNY 2,782,708
APPARATUS FOR TREATING PACKAGE GOODS
Filed May 10, 1955
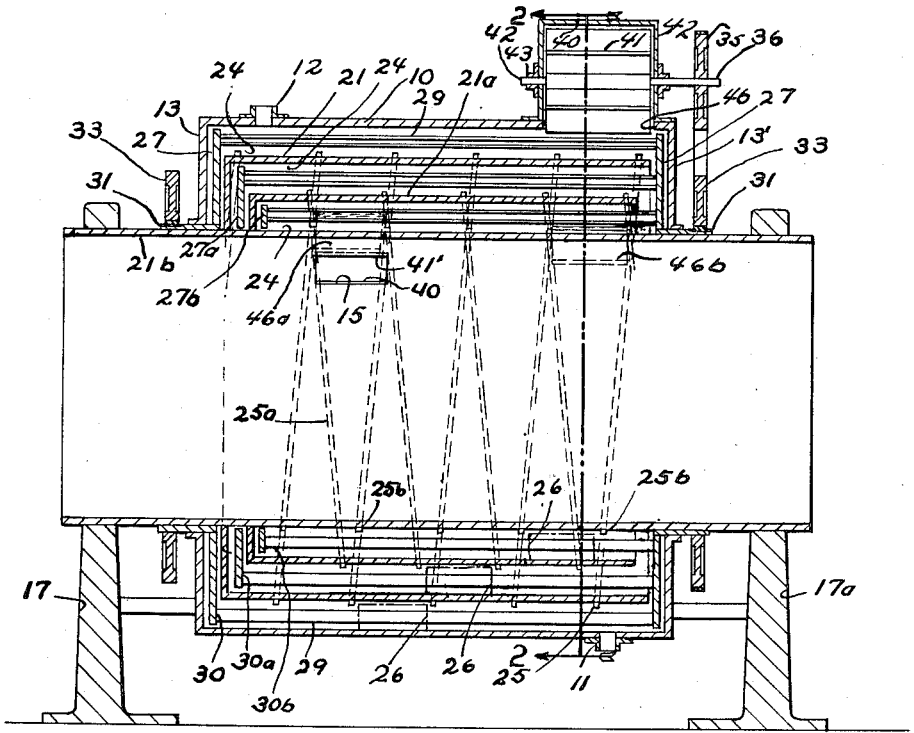
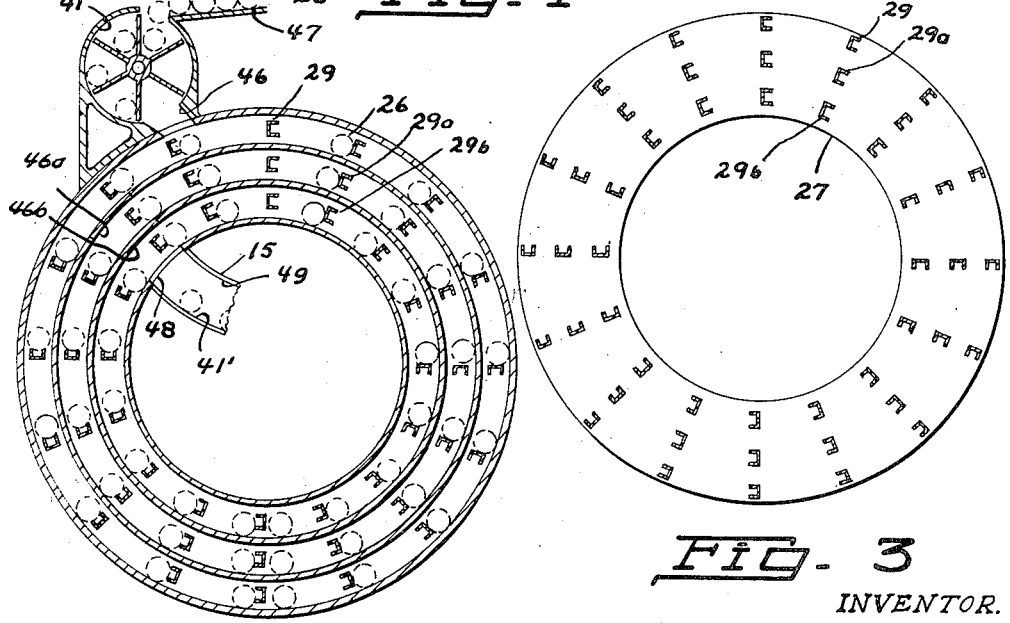
INVENTOR.
EDWARD C. NOVOTNY
BY
ATTORNEY

United States Patent Office 2,782,708
Patented Feb. 26, 1957

2,782,708

APPARATUS FOR TREATING PACKAGED GOODS

Edward C. Novotny, Milwaukee, Wis.

Application May 10, 1955, Serial No. 507,324

4 Claims. (Cl. 99—365)

My invention relates to an apparatus for treating packaged goods, and more particularly to an apparatus for treating materials sealed in tin containers.

The object of my invention is to provide an apparatus for submerging and conveying a plurality of tin containers filled with food stuffs, or the like, through a heated chamber at a governed speed to predetemine the length of time that the cans of food are being processed.

It is manifest to any one familiar with the canning industry that the processing of food sealed in tin can type of containers requires that the cans be submerged in steam or heated water for a predetermined length of time to properly process the food, and that the different types of food requires a different time element to properly perform the processing operation. The device specified, illustrated and claimed herein, provides a positive means for controlling the time for the processing cycle, and provides a positive agitation of the product within the can due to the continuous revolving of the can to insure equal treatment of every particle. The device is positive in its performance and enables a continuous, uninterrupted cycle in the processing operation. It may be constructed for heating or cooling purposes, is economical to manufacture, and is extremely simple to manipulate.

The invention possesses other objects and features of advantages, some of which with the foregoing, will be set forth in the following description of the preferred form of the invention which is illustrated in the drawings accompanying and forming part of the specification. It is to be understood, however, that variations in the showing made by said drawings and description may be adapted within the scope of the invention as set forth in the claims.

Figure 1 is a longitudinal cross-section of the device forming the subject matter of my invention.

Figure 2 is a lateral cross-sectional view of the device taken at the line 2—2 in Figure 1; and Figure 3 is a side, or plan view, of the right hand conveyer end plate showing the channels attached thereto, the channels being shown in cross-section.

Similar characters of reference indicate corresponding parts throughout the several views, and referring now to the same, the character 10 show a cylindrical outer shell horizontally disposed, the shell or drum 10 is shown of a single wall construction, but it may be supplied with insulating material (not shown) on its outer face. There is a tubular inlet port shown as 11 at the bottom of the drum 10, and a tubular outlet port shown as 12 on the top of the drum 10 near the opposite ends thereof. The drum 10 is provided with vertical end walls shown as 13 and 13', and a top housing 14 is shown extending outward from the outer peripheral surface of the outer drum 10 at one end near the top thereof, and another housing shown as 15 projects outward from the inner peripheral surface of the drum near the top thereof, on the opposite end as housing 14.

There are three inside cylinders or drums shown as 21, 21a and 21b which are disposed within each other of smaller diameter respectively and are disposed within the drum 10. Each of the three drums 21, 21a and 21b are of different lengths and open at respective ends. Drum 21b is open at both ends and greater in length than drum 10. The opposite end of each drum 21, 21a is closed but provided with an enlarged central opening, the circumferential area of each opening secured to separate bushings which enclose the drum 21b. The arrangement of each inside cylinder is such that equal spaces 24 are provided between each of the drums. The drum 21b rests on supports 17 and 17a.

Disposed between the vertical ends of the inside and outside cylinders 21 and 10 respectively are vertical conveyor plates 27 as shown in Figure 1 provided with a plurality of cross-members shown as channels 29 are attached at 30 to the inner faces of the conveyor plates 27. The plates 27 on both sides have outwardly extending bearings shown as 31 which encircle the outer peripheral surface of the drum 21d, and there are gears shown as 33 keyed to the bearings 31. A shaft 36 is actuated by means of an electric motor or the like (not shown).

Encased within the housings 14 and 15 are shown sealing mechanisms 40 and 40' respectively. These sealing mechanisms are comprised of outwardly extending vanes 41 and 41' attached to the shafts 42 and 42'. The shaft in the housing 14 is shown journalled at 43 in the side walls of the housing 14 and extends outward at one end.

The outer cylindrical shell or drum 10 is equipped with an inlet opening 46 covered by the housing 14 to accommodate the cans 26 being fed by means of a conveyor 47. The cans 26 roll and rotate on the inclined conveyor, and are lifted one at a time by the vanes 41 of the sealing mechanism 40 on the leading end of the device. Opening 48 is covered by the housing 15 which opening acts as an outlet in the inner cylindrical drum 21b and permits the cans 26 to drop to another conveyor not shown.

The cans 26 which are shown in phantom are deposited through the opening 46 to the outer periphery of the inner drum or cylinder 21, and are rotatably carried upwardly to the top of the drum 21 by the flanges of the channels 29, and as they reach the apex of the drum 21, they will be caused to roll against the back plate of the channels 29, and then downward in a path between the spiral guides 25 engaging the outer peripheral surface of the inner drum 21 until they reach the extreme bottom where they are again pushed upward by the flanges on the channels 29. The space 24 between the drums 21 and 10 being greater than the diameter of the cans 26 will permit free revolving of the cans 26 in their spiral path around the inner drum 21, guided by the spirally disposed conveyor flange 25 which extends outward from the outer periphery of the surface of the inner drum 21.

An opening 46a is provided in the first drum 21 whereby the cans roll between a spiral 25a arranged onto the outside periphery of the drum 21a, this spiral 25a is in reverse direction from spiral 25 the cans then travel over this spiral 25a to an opening 46b in drum 21a and then roll through onto a spiral or conveyor flange shown as 25b which extends outward from the outer periphery of the drum 21b to the discharge opening 46 near the top of said drum 21b. Opening 48 is in line with the end of spiral 25b with said cans deposited in spiral 25b which extends in reverse direction from spiral 25.

Disposed between the adjacent ends of drums 21 and 21a is conveyor plate 27a. A plurality of cross-members 29a similar to channels 29 are attached at 30a to the inner face of the conveyor plate 27a and the conveyor plate 27. Disposed between the adjacent ends of drums 21a and 21b is a conveyor plate 27b. A plurality of cross-members 29b, similar to channels 29 are attached at 30b to the inner face of the conveyor plate 27b and the conveyor plate 27. The function of the conveyor plates 27a and 27b, and the channels 29a and 29b are similar to conveyor plates 27 and channels 29.

The jack shaft 36 is revolved by means of an actuating device such as an electric motor (not shown) through a variable speed transmission (not shown), and by the revolving of the drive shaft 36, the gears 35, which are connected (through any suitable means) will cause the circular plates to revolve. By referring to Figure 1, it will be noted that the cans 26 which are shown in phantom are deposited through the opening 46 to the outer periphery of the inner drum or cylinder 21 and the cans progress over the drums 21, 21a and 21b as heretofore explained.

When the cans reach a point immediately above the opening 41' near the top of the drum 21b, they will be permitted to drop onto the incline conveyor 49 by contacting first one of the vanes 40'.

The driving and driven means, such as the gears, will synchronize with the movement of the vanes 41 in the feeding mechanism, so that the cans 26 will be picked up and deposited in proper alignment between the spiral guides. The speed of revolution of the conveyor plates of the drums will determine the length of time each can will be disposed between the cylinders which spaces 24 may be filled with live steam or the like entering at the tubular opening 11, and exhausting at the tubular opening 12, in the outer cylinder. The variable speed transmission (not shown) will determine the R. P. M. of the conveyors in their path around the outer periphery of the inner drums.

The cans being treated are moved by means of the channel members 29, 29a and 29b which in turn are driven by the plates 27, 27a and 27b respectively. The spiral flanges 25, 25a and 25b cause the cans to travel over the assembly.

In the chosen embodiments of my invention exemplified by the accompanying drawings, there are features not heretofore revealed or employed, and although I have shown a particular arrangement of the component parts constituting the device, I am fully cognizant of the fact that many changes may be made in the form and configuration as well as the arrangement of the parts, without affecting the operativeness or spirit of my invention, or the scope of the appended claims.

Having thus described my invention, what I claim and desire to secure by Letters Patent in the United States is:

1. In an apparatus for treating canned goods, an outer casing having an enlarged centrally disposed opening at each end, a hollow drum arranged through each opening and extending outwardly beyond each opening, a pair of drums disposed between said casing and said first mentioned drum and enclosed wholly therein, each of said drums equally spaced from each other with the adjacent drum to said casing spaced the same distance as said drums, spaced medium outlets on said casing to receive and expel means for treating said canned goods, a pair of driven plates disposed within said casing and between the ends of said casing and said adjacent drum, other driven plates one each disposed between adjacent ends of said drums, a plurality of spaced channels secured to said first plates, other spaced channels secured to each of said other driven plates and one of said first mentioned plates, each of said channels arranged a distance equally from the outer periphery of each adjacent drum, spiral members arranged above the outer periphery of each of said drums, rotative movement of said plates moving said cans in said spirals over the peripheral surface of each drum and means arranged to transfer each can from the peripheral surface of said adjacent drums in turn to said other drums, said cans being transferred, after traveling over said drums, into the interior of said hollow drum.

2. In an apparatus for treating canned goods, an outer casing having an enlarged centrally disposed opening at each end, a hollow drum arranged through each opening and extending outwardly beyond each opening, a pair of drums disposed between said casing and said first mentioned drum and enclosed wholly therein, each of said drums equally spaced from each other with the adjacent drum to said casing spaced the same distance as said drums, spaced medium outlets on said casing to receive and expel means for treating said canned goods, a pair of driven plates disposed within said casing and between the ends of said casing and said adjacent drum, other driven plates one each disposed between adjacent ends of said drums, a plurality of spaced channels secured to said first plates, other spaced channels secured to each of said other driven plates and one of said first mentioned plates, each of said channels arranged a distance equally from the outer periphery of each adjacent drum, spiral members arranged above the outer periphery of each of said drums, rotative movement of said plates moving said cans in said spirals over the peripheral surface of each drum and means arranged to transfer each can from the peripheral surface of said adjacent drums in turn to said other drums, said means including an opening adjacent one end of the spiral on each drum whereby the cans are rolled through to the next drum in line, said cans being transferred, after traveling over said drums, into the interior of said hollow drum.

3. In an apparatus for treating canned goods, an outer casing having an enlarged centrally disposed opening at each end, a hollow drum arranged through each opening and extending outwardly beyond each opening, a pair of drums disposed between said casing and said first mentioned drum and enclosing wholly therein, each of said drums equally spaced from each other with the adjacent drum to said casing spaced the same distance as said drums, spaced medium outlets on said casing to receive and expel means for treating said canned goods, a pair of driven plates disposed within said casing and between the ends of said casing and said adjacent drum, other driven plates one each disposed between adjacent ends of said drums, a plurality of spaced channels secured to said first plates, other spaced channels secured to each of said other driven plates and one of said first mentioned plates, each of said channels arranged a distance equally from the outer periphery of each adjacent drum, spiral members arranged above the outer periphery of each of said drums, rotative movement of said plates moving said cans in said spirals over the peripheral surface of each drum and means arranged to transfer each can from the peripheral surface of said adjacent drums in turn to said other drums, said means including an opening adjacent one end of the spiral on each drum whereby the cans are rolled through to the next drum in line, an opening into the interior of said hollow drum adapted to receive and discharge said cans remote from said casing.

4. In an apparatus for treating canned goods, an outer casing having an enlarged centrally disposed opening at each end, a hollow cylinder arranged through each opening and extending beyond each end of said casing, a pair of drums of unequal lengths encircling said cylinder and arranged between said cylinder and said casing and enclosed therebetween, said casing, cylinder and drums spaced equally one from another, spaced medium outlets on said casing to receive and expel means for treating said canned goods, an inlet formed in said casing to roll said goods onto the outer periphery of said drum adjacent said casing, an outlet formed in said cylinder to expel said canned goods into the interior of said cylinder, a pair of driven plates floating on said cylinder and disposed between the ends of said casing and said adjacent drum, other driven plates, one each disposed between adjacent ends of said drums and said cylinder, a plurality of spaced channels secured to said first plates and arranged around and between said casing and said adjacent drum, other spaced channels arranged around and between said drums and said cylinder respectively, one group of said last mentioned channels secured to one of said other plates and one of said first mentioned plates, the other group of said channels secured to said other plate and the same of said pair of plates, a spiral member arranged about the outer periphery of said adjacent drum, another spiral reverse of said first spiral arranged about the outer periphery of said other drums, another spiral following in the same direction of said first spiral arranged about the outer periphery of said cylinder, rotative movement of said plates moving said cans from the inlet on said casing, progressively over the spirals to the discharge outlet in said cylinder.

References Cited in the file of this patent

UNITED STATES PATENTS 1,154,611     Burpee ---------------- Sept. 28, 1915